US012589315B2

(12) United States Patent
Gallery et al.

(10) Patent No.: US 12,589,315 B2
(45) Date of Patent: Mar. 31, 2026

(54) VIRTUAL AND AUGMENTED REALITY SHOOTING SYSTEMS AND METHODS

(71) Applicant: HVRT CORP., Orofino, ID (US)

(72) Inventors: Nathaniel P. Gallery, Lewiston, ID (US); Andrew McCormick, Seattle, WA (US); Alex Scott Pickett, Orofino, ID (US); Klaus Johnson, Orofino, ID (US)

(73) Assignee: HVRT CORP, Orofino, ID (US)

( * ) Notice: Subject to any disclaimer, the term of this patent is extended or adjusted under 35 U.S.C. 154(b) by 763 days.

(21) Appl. No.: 17/961,718

(22) Filed: Oct. 7, 2022

(65) Prior Publication Data

US 2023/0113472 A1 Apr. 13, 2023

Related U.S. Application Data

(60) Provisional application No. 63/349,859, filed on Jun. 7, 2022, provisional application No. 63/255,123, filed on Oct. 13, 2021.

(51) Int. Cl.
*A63F 13/837* (2014.01)
*F41G 3/26* (2006.01)
*G02B 27/01* (2006.01)

(52) U.S. Cl.
CPC .............. *A63F 13/837* (2014.09); *F41G 3/26* (2013.01); *G02B 27/017* (2013.01); *F41G 3/2694* (2013.01); *G02B 2027/0138* (2013.01); *G02B 2027/014* (2013.01)

(58) Field of Classification Search
CPC ... A63F 13/837; A63F 13/573; G02B 27/017; G02B 2027/014; G02B 2027/0138
See application file for complete search history.

(56) References Cited

U.S. PATENT DOCUMENTS

| | | | | |
|---|---|---|---|---|
| 5,920,995 A | * | 7/1999 | Sammut | ................. G02B 23/12 |
| | | | | 42/122 |
| 6,032,374 A | | 3/2000 | Sammut | |
| 6,453,595 B1 | | 9/2002 | Sammut | |
| 6,516,699 B2 | | 2/2003 | Sammut et al. | |
| 6,681,512 B2 | | 1/2004 | Sammut | |
| 7,712,225 B2 | | 5/2010 | Sammut | |
| 7,832,137 B2 | | 11/2010 | Sammut et al. | |
| 7,856,750 B2 | | 12/2010 | Sammut et al. | |
| 7,937,878 B2 | | 5/2011 | Sammut et al. | |
| 7,946,048 B1 | | 5/2011 | Sammut | |
| 8,109,029 B1 | | 2/2012 | Sammut et al. | |
| 8,230,635 B2 | | 7/2012 | Sammut et al. | |

(Continued)

OTHER PUBLICATIONS

Davis, American Rifleman, Mar. 1989, 1 page.

(Continued)

*Primary Examiner* — Omkar A Deodhar
(74) *Attorney, Agent, or Firm* — Casimir Jones, S.C.; Kirk J. Hogan

(57) ABSTRACT

Provided herein are systems and methods for training, maintaining and using skills for shooting a target with a projectile. More particularly, the invention relates to virtual and/or augmented reality, augmented reality, mixed reality and consensual reality systems and methods to train and maintain shooting skills in military, law enforcement, competition and sporting settings, environments and missions.

38 Claims, 18 Drawing Sheets

(56) References Cited

U.S. PATENT DOCUMENTS

| | | | |
|---|---|---|---|
| 8,353,454 | B2 | 1/2013 | Sammut et al. |
| 8,656,630 | B2 | 2/2014 | Sammut |
| 8,707,608 | B2 | 4/2014 | Sammut et al. |
| 8,893,971 | B1 | 11/2014 | Sammut et al. |
| 8,905,307 | B2 | 12/2014 | Sammut et al. |
| 8,959,824 | B2 | 2/2015 | Sammut et al. |
| 8,966,806 | B2 | 3/2015 | Sammut et al. |
| 8,991,702 | B1 | 3/2015 | Sammut et al. |
| 9,068,794 | B1 | 6/2015 | Sammut |
| 9,250,038 | B2 | 2/2016 | Sammut et al. |
| 9,255,771 | B2 | 2/2016 | Sammut et al. |
| 9,335,123 | B2 | 5/2016 | Sammut |
| 9,459,077 | B2 | 10/2016 | Sammut et al. |
| 9,500,444 | B2 | 11/2016 | Sammut et al. |
| 9,574,850 | B2 | 2/2017 | Sammut et al. |
| 9,612,086 | B2 | 4/2017 | Sammut et al. |
| 9,869,530 | B2 | 1/2018 | Sammut et al. |
| 10,539,393 | B2 | 1/2020 | Surdu et al. |

| | | | |
|---|---|---|---|
| 2009/0235570 | A1 | 9/2009 | Sammut et al. |
| 2012/0097741 | A1 | 4/2012 | Karcher |
| 2014/0215876 | A1 | 8/2014 | Popa-Simil |
| 2015/0108215 | A1* | 4/2015 | Ehrlich .................... F41G 3/12 |
| | | | 235/404 |
| 2015/0276349 | A1 | 10/2015 | Northrup et al. |
| 2018/0172404 | A1* | 6/2018 | Kleck .................... F41G 3/065 |
| 2019/0226808 | A1* | 7/2019 | Gallery ................ F41G 3/2694 |

OTHER PUBLICATIONS

International search Report and Written Opinion issued for corresponding Application No. PCT/US2022/045995 on Feb. 16, 2023, 11 pages.

Zhu et al., "AR-Weapon: Live Augmented Reality based First-Person Shooting System" 2015, 16 pages.

Supplementary European Search Report for European Application No. 22881586.6, mailed Jul. 24, 2025, 13 Pages.

* cited by examiner

FIG. 2

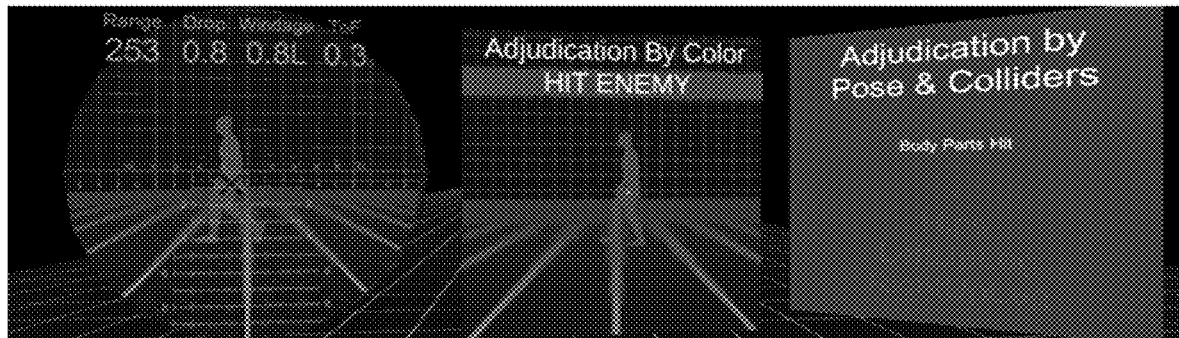

Purpose: demonstrate hit-detection in a 3d game engine.

Used for: synthetic training.

Note: bullet travels through 3d space while target continues moving.

Purpose: demonstrate hit-detection with a single still image.

Used for: adjudication during FoF training.

Note: image was captured at the instant bullet was created; but is still accurate because our solver uses ToF and target's movement speed.

Purpose: demonstrate hit detection with skeletal pose tracking.

Used for: improved casualty assessment during FoF training

VIRTUAL AND AUGMENTED REALITY SHOOTING SYSTEMS AND METHODS

This application claims priority to U.S. provisional patent application Ser. No. 63/255,123, filed Oct. 13, 2021, and U.S. provisional patent application Ser. No. 63/349,859, filed Jun. 7. 2022, which is incorporated herein by reference in its entirety.

FIELD

Provided herein are systems and methods for training, maintaining and using skills for shooting a target with a projectile. More particularly, the invention relates to virtual and/or augmented reality, augmented reality, mixed reality and consensual reality systems and methods to train and maintain shooting skills in military, law enforcement, competition and sporting settings, environments and missions.

BACKGROUND

Firearms, riflescopes, data acquisition devices and ballistics calculators provide shooting options for shooters in a diversity of settings, environments and missions. Real-world shooting experience in a diversity of settings, environments and missions is limited by lack of opportunity, cost, inefficiencies in training and re-training, and personalization and customization of training. What is needed are systems and methods that allow shooters to acquire experience with firearms, riflescopes, data acquisition devices and ballistics calculators in a diversity of settings, environments and missions.

SUMMARY

Provided herein are systems and methods for training, maintaining and using skills for shooting a target with a projectile. More particularly, the invention relates to virtual and/or augmented reality, augmented reality, mixed reality and consensual reality systems and methods to train and maintain shooting skills in military, law enforcement, competition and sporting settings, environments and missions. The systems and methods find use in training shooters under a wide range of different shooting conditions to use their equipment and to optimally develop their skills. Additionally, the systems and methods find use in developing and testing shooting systems, including weapons, optical devices (e.g., riflescopes, spotting scopes, etc.), data acquisition devices (e.g., wind speed and direction, elevation, barometric pressure), ballistics calculators, and other shooting equipment or accessories (e.g., laser sighting aids, hi pods, muzzle breaks). The systems and methods find use for all types of shooters and shooting scenarios, including, but not limited to, military and combat shooting, hunting, target shooting, recreational shooting, and competitive shooting.

In some embodiments, the present invention provides a system, comprising: at least one digital image capture device; a processor; and non-transitory computer readable media comprising instructions for shooting a target with a projectile that when executed by the processor cause said processor to execute a shooting application, wherein the shooting application provides at least one ballistic solution, wherein the ballistic solution comprises geometric ranging a range from a user to the target comprising at least one image from the at least one digital image capture device. In some embodiments, the geometric ranging a range comprises division of an actual target dimension by a perceived target dimension in pixels provided by the at least one digital image capture device to yield the range from the user to the target. In some embodiments, the actual target dimension is in millimeters (mm), the perceived target dimension provided by the at least one digital image capture device is in milliradians (mrad), and the range is in meters (m). In some embodiments, the at least one digital image capture device is a camera, a visible light image capture device, an infrared image capture device, a thermal image capture device, a day vision image capture device, and/or a night vision image capture device.

In some embodiments, the at least one digital image capture device comprises one or more image sensors. In some embodiments, the at least one digital image capture device comprises analog-to-digital converting circuitry coupled to the one or more image sensors configured to generate at least one digital image. In some embodiments, the at least one digital image capture device comprises analog-to-digital converting circuitry coupled to image memory. In some embodiments, the processor is a digital image processor configured to generate at least one digital image. In some embodiments, the processor is intrinsic to the image capture device. In some embodiments, the processor is extrinsic to the image capture device. In some embodiments, the at least one digital image capture device comprises one or more lenses.

In some embodiments, the image capture device comprises an image of at least one pose of the target marking a shot at the target on the least one image from the at least one image capture device wherein a dimension of the pose provides a range from the user to the target. In some embodiments, the image capture device comprises an image of an impact of the target with a real and/or a simulated said projectile. In some embodiments, the non-transitory computer readable media comprising instructions for shooting a target with a projectile comprises hardware in a circuit, module and/or component. In some embodiments, the non-transitory computer readable media comprising instructions for shooting a target with a projectile is provided by one or more hardware components comprising optic only hardware, optic and body worn processor hardware, optic and cloud processor hardware, optic, head mounted display (MID) and body worn processor hardware, optic, HMD and cloud processor hardware, and/or optic and HMD hardware. In some embodiments, the non-transitory computer readable media comprising instructions for shooting a target with a projectile comprises machine learning and/or artificial intelligence to provide wind direction, wind deflection, the target direction and velocity of travel, and/or safe user positioning.

In some embodiments, the present invention comprises an interface and/or a viewer. In some embodiments, the interface comprises a user interface, a visual interface, an auditory interface, a communication interface, and/or a network interface. In some embodiments, the viewer is a headset. In some embodiments, the target is displayed on the headset. In some embodiments, the headset comprises one or more of the processor, a power source connected to the processor, memory connected to the processor, a communication interface connected to the processor, a display unit connected to the processor, and/or one or more sensors connected to the processor. In some embodiments, the one or more sensors is a weather meter, a wind meter, and/or a laser rangefinder. In some embodiments, the headset is a virtual reality headset, an augmented reality headset, a mixed reality headset, and/or a consensual reality headset. In some embodiments, the headset provides an aiming point solution that is visible in a field of view comprising one or more of target movement, wind velocity, wind direction, wind deflection, target range, projectile drop, and time of flight. In some embodiments, the viewer displays the range and/or the ballistic solution.

In some embodiments, the present invention provides a riflescope comprising the digital image capture device. In some embodiments, the riflescope comprises the digital image capture device and the processor. In some embodiments, the riflescope comprises a reticle. In some embodiments, the riflescope is a first focal plane riflescope. In some embodiments, the digital image capture device calibrates magnification of the riflescope. In some embodiments, the present invention comprises a spotting scope comprising the digital image capture device. In some embodiments, the spotting scope comprises the digital image capture device and the processor. In some embodiments, the present invention comprises at least one riflescope and at least one spotting scope.

In some embodiments, the non-transitory computer readable media comprise computer vision instructions that when executed by the processor identify the target and/or one or more anatomical features of the target. In some embodiments, the processor executes an interactive advanced distributed learning (ADLI) environment. In some embodiments, the ADLI environment is a virtual ADLI environment.

In some embodiments, the system is in physical contact with the user. In some embodiments, the system is not in physical contact with the user. In some embodiments, the system is in physical contact with one or more spotters, one or more other users, a surface drone, an aerial drone, a land vehicle, an aircraft, a watercraft, a spacecraft and/or a satellite.

DESCRIPTION OF THE FIGURES

FIG. 2 shows adjudication of projectile impact using target pose in force on force (FoF) training, and time of flight (TOF) and target movement ballistic solutions.

FIG. 11 shows data for After Action Review (AAR) comprising, for example, the location of a projectile impact, consequences of the impact, proper correction for wind speed and direction, and/or target rate of travel and the like.

DEFINITIONS

To facilitate an understanding of the present disclosure, a number of terms and phrases are defined below:

As used herein, the terms "computer memory" and "computer memory device" refer to any storage media readable by a computer processor. Examples of computer memory include, but are not limited to, RAM, ROM, computer chips, digital video disc (DVDs), compact discs (CDs), hard disk drives (MD), and magnetic tape.

As used herein, the term "computer readable medium" refers to any device or system for storing and providing information (e.g., data and instructions) to a computer processor. Examples of computer readable media include, but are not limited to, DVDs, CDs, hard disk drives, memory chip, magnetic tape and servers for streaming media over networks. A computer program sometimes is embodied on a tangible computer-readable medium, and sometimes is tangibly embodied on a non-transitory computer-readable medium.

As used herein, the terms "processor" and "central processing unit" or "CPU" are used interchangeably and refer to a device that is able to read a program from a computer memory (e.g., ROM or other computer memory) and perform a set of steps according to the program.

DETAILED DESCRIPTION

Provided herein are systems and methods for training, maintaining and using skills for shooting a target with a projectile. More particularly, the invention relates to virtual and/or augmented reality, augmented reality, mixed reality and consensual reality systems and methods to train and maintain shooting skills in military, law enforcement, competition and sporting settings, environments and missions.

In particular, provided herein are systems and methods for shooting simulation comprising a controller, a viewer, and a computer. Systems and methods of the present invention provide, for example, training systems for rifle, mortar, combat, law enforcement, and the like with virtual and/or augmented reality and/or augmented reality displays (for example, headset, riflescope, and spotting scope displays), simulated targets, systems to track aiming and firearm control (using for example, a real rifle, a disabled rifle, a simulated rifle, a grenade launcher, a mortar, a video game controller, and/or manual hand motion). In some embodiments, the systems and methods comprise a ballistic solver that simulates one or more real-world projectile flight paths. In some embodiments, the systems and methods provide auditory and. visual inputs, with simulated realistic adjudication of shooting results based on real-world projectile ballistics and target location relative to a user's position. In some embodiments, user and target locations are global positioning system (GPS)-based. In some embodiments, user and/or target locations are optically tracked. In some embodiments, a user is notified of simulated damage to and failure of shooting equipment and gear including, for example, a misfire, a projectile jam, magazine failure to feed and the like.

Figure 1:
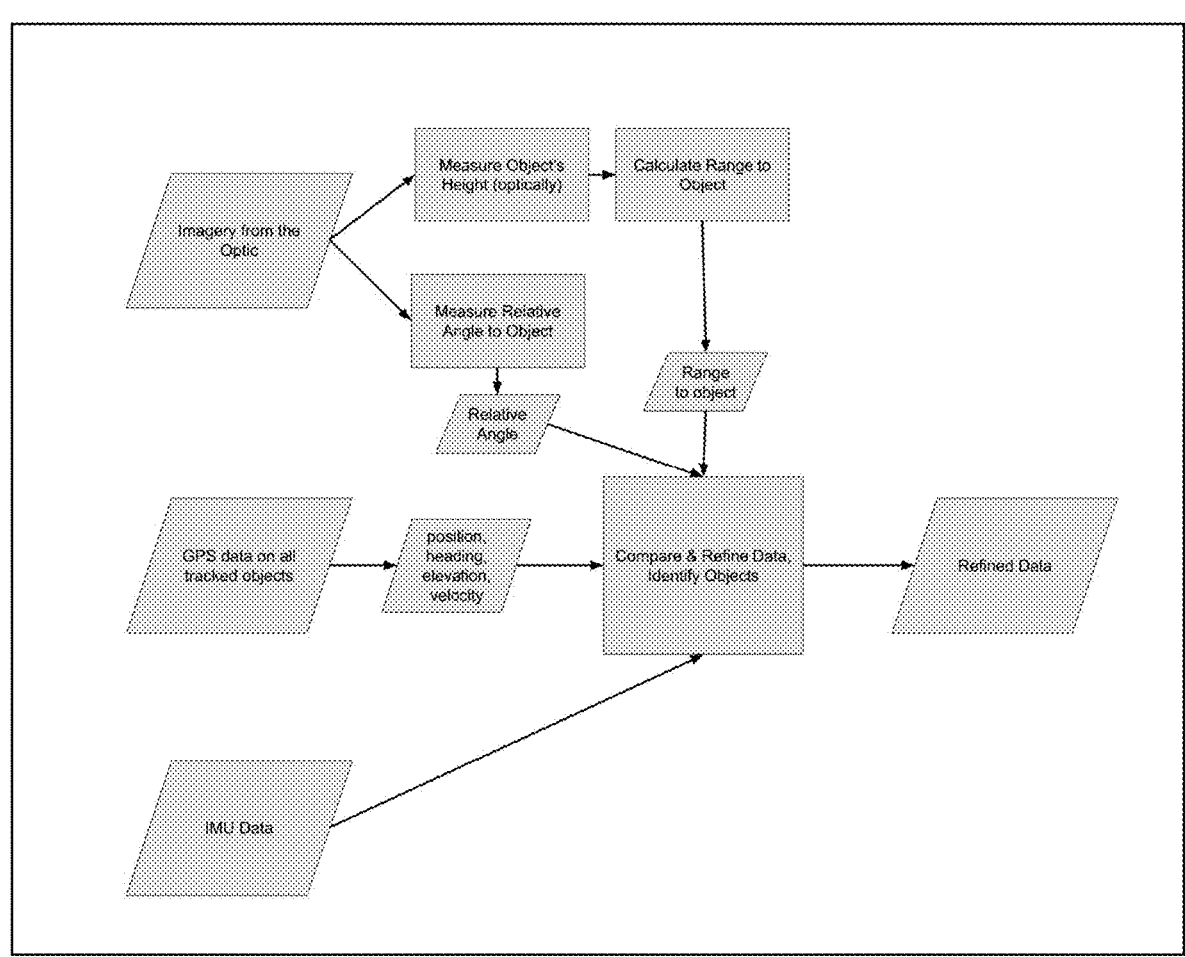
FIG. 1 shows a system for determining the position of objects by combining various data sources.

In some embodiments, the systems and methods of the present invention provide force on force training for rifle, mortar, grenade, and the like training with virtual and or augmented reality and/or augmented reality display (see e.g., FIG. 1, and FIG. 2). In some embodiments, the systems and methods provide position tracking of one or more or all users, a tracking method linked to a weapon control method, and a ballistic solver to simulate realistic flight paths to determine outcomes of firing projectiles on intended targets. In some embodiments, the targets are real-word combatant forces. In some embodiments, the targets are synthetic targets. In some embodiments, visual images (for example, optical images, thermal images, and/or infrared images) are compared prior to, during and after firing according to one or more ballistic solutions to determine shooting outcomes. In some embodiments, the system notifies a user if real-world targets have been hit. In some embodiments, the system provides moving targets and/or moving user firing positions. In some embodiments, the system provides a ballistics solver that replicates real-world auditory and visual stimuli.

In some embodiments, systems and methods of the present invention provide a Mission Rehearsal system using an augmented reality, mixed reality and/or virtual and/or augmented reality display.

Figure 3:
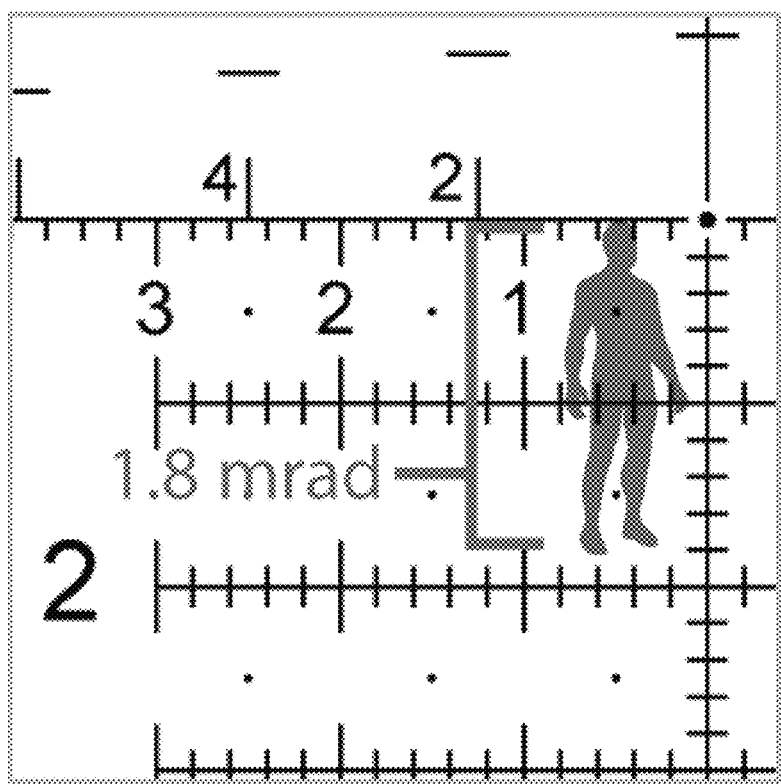
FIG. 3 shows an example of geometric ranging.
Figure 4:
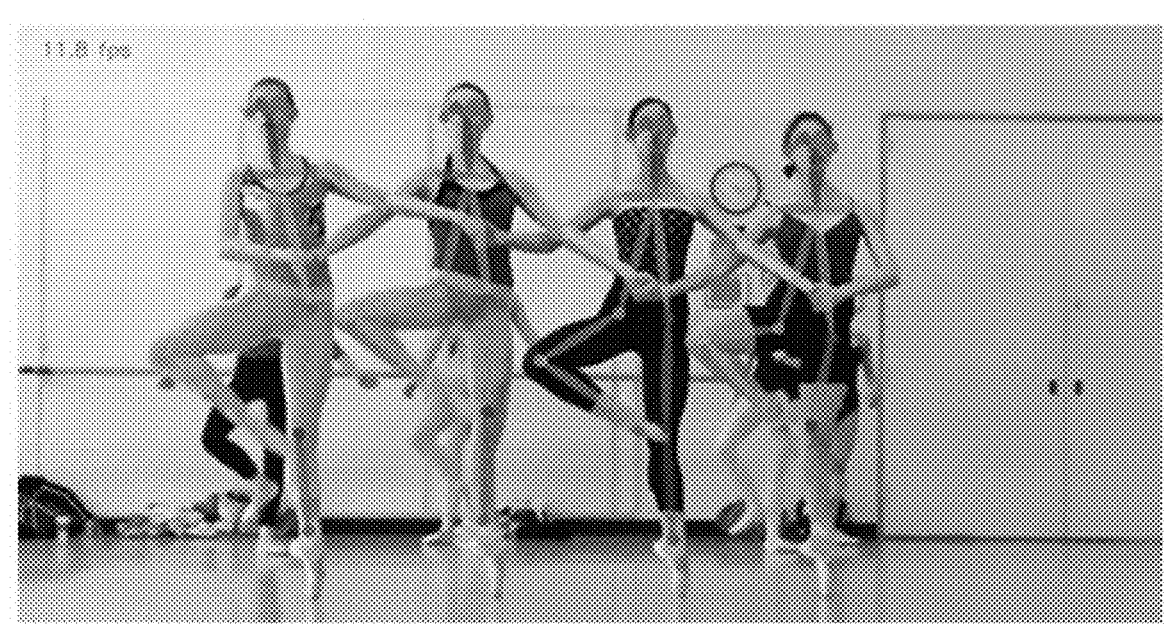
FIG. 4 shows an example of computer vision used to recognize a human and a human skeletal pose.
Figure 5:
FIG. 5 shows an example of computer vision to detect and/or identify one or more humans without skeletal pose analysis.
Figure 6:
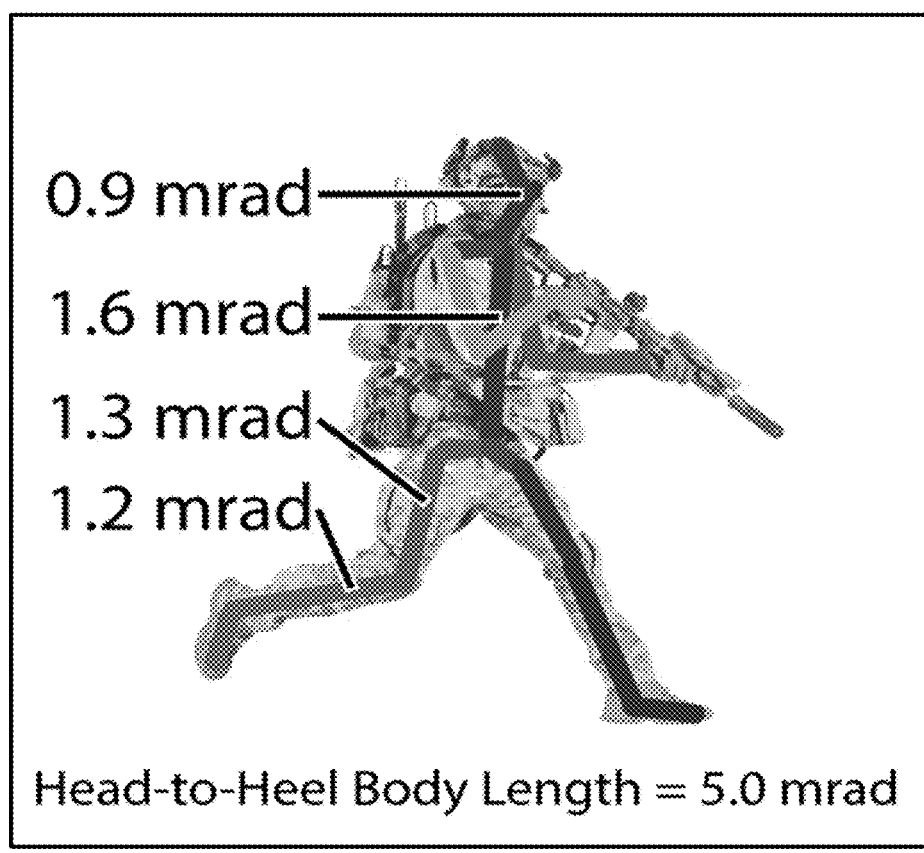
FIG. 6, shows an example of computer vision of a human in an image with a head to heel body length of 5 mrads.
Figure 7:
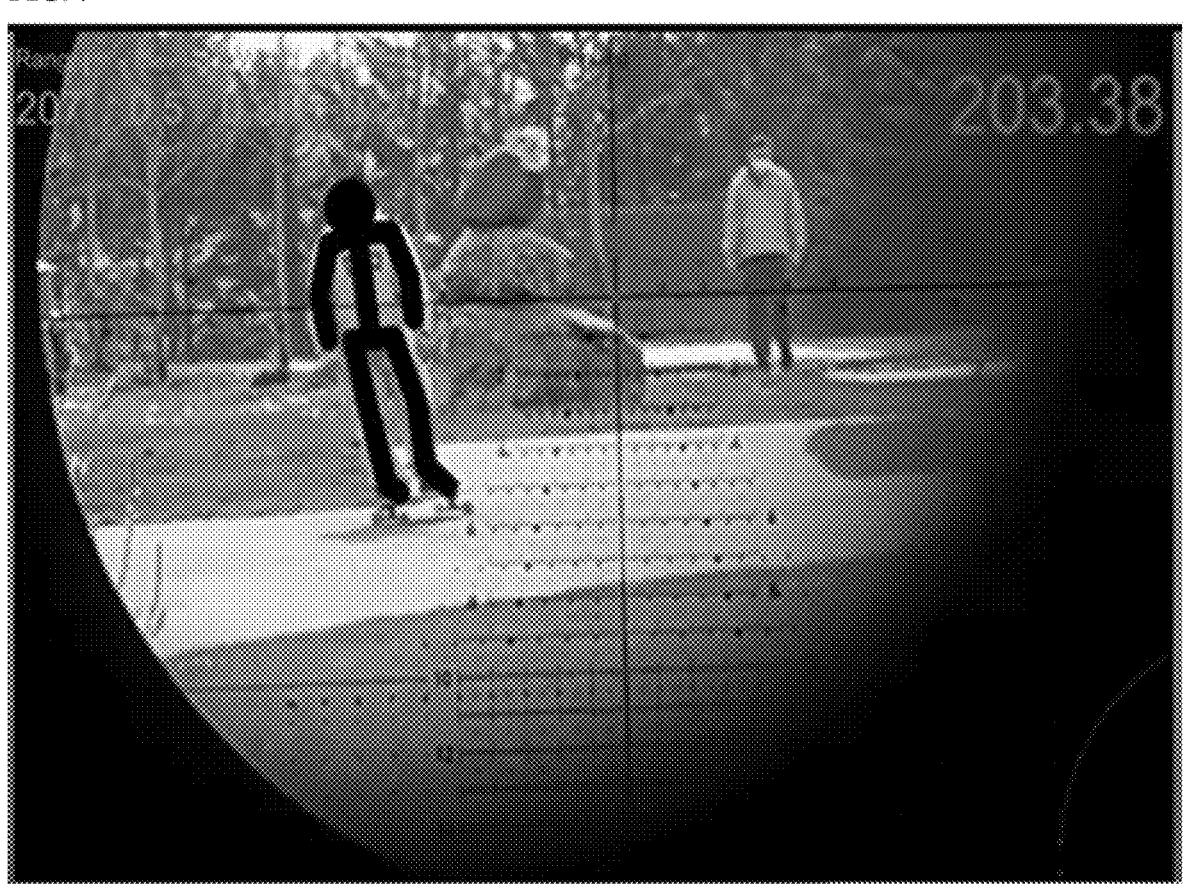
FIG. 7 shows an example of geometric ranging by computer vision.

In some embodiments, the system provides 3-dimensional geo-referenced simulated or replicated location. In some embodiments, the system comprises geometric ranging. Geometric ranging is performed by the formula wherein the actual target height in millimeters (mm) is divided by the perceived target height in milliradians (mrad) to yield the range to the target in meters (m). FIG. 3 shows a user's view of a target observed by a target acquisition device, for example, a rifle scope. The target is observed to be 1.8 mrad in height. The target is known or assumed to be 1800 mm tall, and thus the range to the target is 1000 m. In some embodiments, computer vision (CV) automates geometric ranging. FIG. 4 shows and example of use of computer vision to recognize one or more humans, and to recognize the skeletal pose of the one or more humans, as an alternative to use of a user's unassisted ocular vision. Computer vision may be instantaneous, more accurate than a user's unassisted vision, and able to measure a target's total body length in a wide diversity of poses and postures. FIG. 5 shows an example of computer vision to detect and/or identify one or more humans without skeletal pose analysis. In computer vision, one or more images from an image capture device are transmitted to a processor and analyzed by CV software to identify anatomical features, for example, a head, right shoulder, left elbow, right heel and the like. The position and pose of each anatomical feature is identified in a coordinate field within an image, for example:

a. Head at $(X_1,Y_1)$ b. Chest at $(X_2,Y_2)$ c. Right Hip at $(X_3,Y_3)$ d. Right Knee at $(X_4,Y_4)$ e. Right Heel at $(X_5,Y_5)$ Any frame of reference that provides the relative positions of features of interest in an image is appropriate for computer vision as provided herein. Next, the distances between anatomical features are calculated and summed to provide the total body length. The total body length is then multiplied by a coefficient that converts total body length to milliradians. FIG. 6 shows an example of a human in an image with a head to heel body length of 5 mrads. As provided above, the actual target height in millimeters (mm) is divided by the perceived target height in milliradians (mrad) provided by computer vision to yield the range to the target in meters (m). FIG. 7 shows an example of geometric ranging by computer vision in which a target assumed to be 1700 mm in height is measured by computer vision to be 8.4 mrad tail for a range to the target of 203 m (1700 mm/8.4 mrad=203 m). Different anatomic distances may be actual or estimated, for example, 12" from the top of the head to the break of the shoulders, 20" shoulder width, 40" from the top of the head to the groin, and may further comprise dimensions of known objects including, for example, vehicles of known, make, model and dimension, vehicle wheels and tires, weapons, buildings and building features (e.g., doorframes) and the like. Different embodiments of the systems of the present invention may comprise different range coefficients that may correlate with image size and resolution, image magnification, image capture device field of view and the like. In some embodiments computer vision is used to identify objects and targets. In some embodiments, images from drones, satellites, aerial surveillance and similar sources are used to measure and/or to confirm one or more ranges from a user to a target.

In some embodiments, the ballistic solver is configured to fire real-world and/or simulated rifles, pistols, mortars, and other weapons. In some embodiments, the system simulates synthetic enemy movement and return fire based on the ballistics of imputed enemy combatant weapons. In some embodiments, the system displays safe areas and danger areas to one or more users based on the real-world ballistics of the enemy combatant weaponry.

In some embodiments, the systems and methods of the present invention provide a display, a ballistic solver, and a computer vision sensor detecting/target tracking component that identifies a target type and position including, for example, tires, trucks, tanks, doors, windows, humans and their pose, and/or animals), and determines the range to a target using geometric ranging to calculate a firing solution and display it to a user. In some embodiments, the system identifies animal types and species according to or in addition to user inputs. In some embodiments, the user and the target are tracked by GPS location. In some embodiments, the user is remote or removed from the system wherein, for example, the system is a drone-mounted system, or an artificial intelligence robotic system. In some embodiments, the system provides a camera for machine learning to estimate wind speed and provide one or more wind hold solutions.

Figure 8:
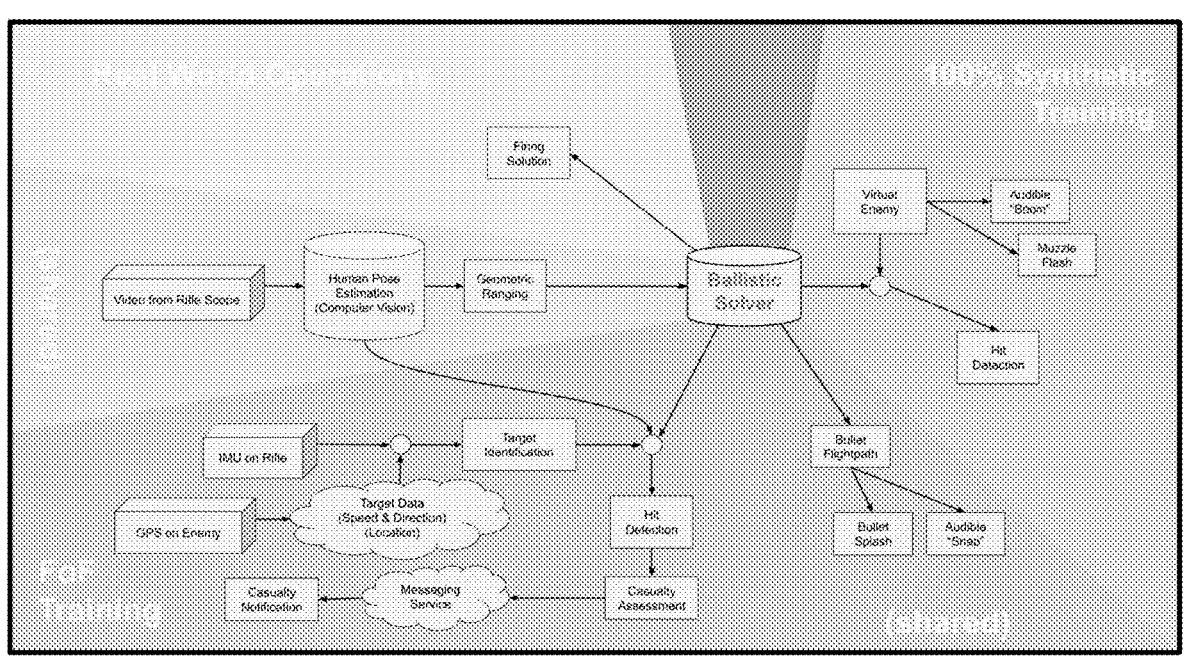
FIG. 8 shows a computer vision and a ballistics calculator flowchart.

In some embodiments, the systems and methods of the present invention determine the position of one or more objects by combining diverse data sources (see e.g., FIG. 1). In some embodiments, the data source is an inertial measurement unit (IMU) that provides the angle between two objects relative to magnetic North. In some embodiments, the data source is a computer vision unit the provides the distance between two objects (see e.g., FIG. 8). In some embodiments, the data source comprises GPS data that provides the location of one or more objects. In some embodiments, the data from diverse data sources is compared from one or more sources to another, for example, IMU data plus GPS data to determine a refined angle between one or more objects, and or computer vision plus GPS data to estimate a refined range to one or more targets. In some embodiments, the systems and methods provide object identification wherein multiple objects that exist within a space, and the refined data is used to identify which object is being observed. In some embodiments, the systems and methods provide accurate placement of virtual and/or augmented objects. For example, in an augmented reality application, the refined angular data and the GPS positional data are combined such that virtual and/or augmented objects (for example, the flightpath of a projectile) are accurately simulated across a large geographic area.

In some embodiments, the systems and methods of the present invention support training with ballistics integration into force on force augmented reality training systems and exercises. In some embodiments, the targets are real-world targets and/or synthetic targets. In some embodiments, the system simulates terminal effects including, for example, a hit on target, bullet splash, auditory and visual effects and projectile flightpath. In some embodiments, the system provides multi-user GPS location-based data. In some embodiments, the systems and methods find use with moving targets and/or moving shooting positions. In some embodiments, the system uses thermal images, night vision images, remote image sources, ultraviolet images and the like. Systems and methods of the present invention are configured for uses in fog, smoke, dark, concealment, and other obscurants. In some embodiments, the system is integrated into a large, networked training environment. In some embodiments, the systems and methods incorporate shooter biometric data to improve feedback/training. In some embodiments, haptic feedback is provided when a "real-world" human target is struck. In some embodiments, the system supports training in shooting over, through and around obstacles. In some embodiments, the system comprises direct munitions and or indirection munitions. In some embodiments, a camera captures performance through a headset and communicates performance criteria to one or more instructors. In some embodiments, the system comprises one or more sensors on one or more rifles, mortars, grenade launchers, and weapons to support weapon orientation to the system. In some embodiments, sensors are provided on weapon support equipment including, for example, sighting equipment, weather equipment, ranging equipment and the like. In some embodiments, a camera in a headset coordinates sensor input and display.

Figure 9:
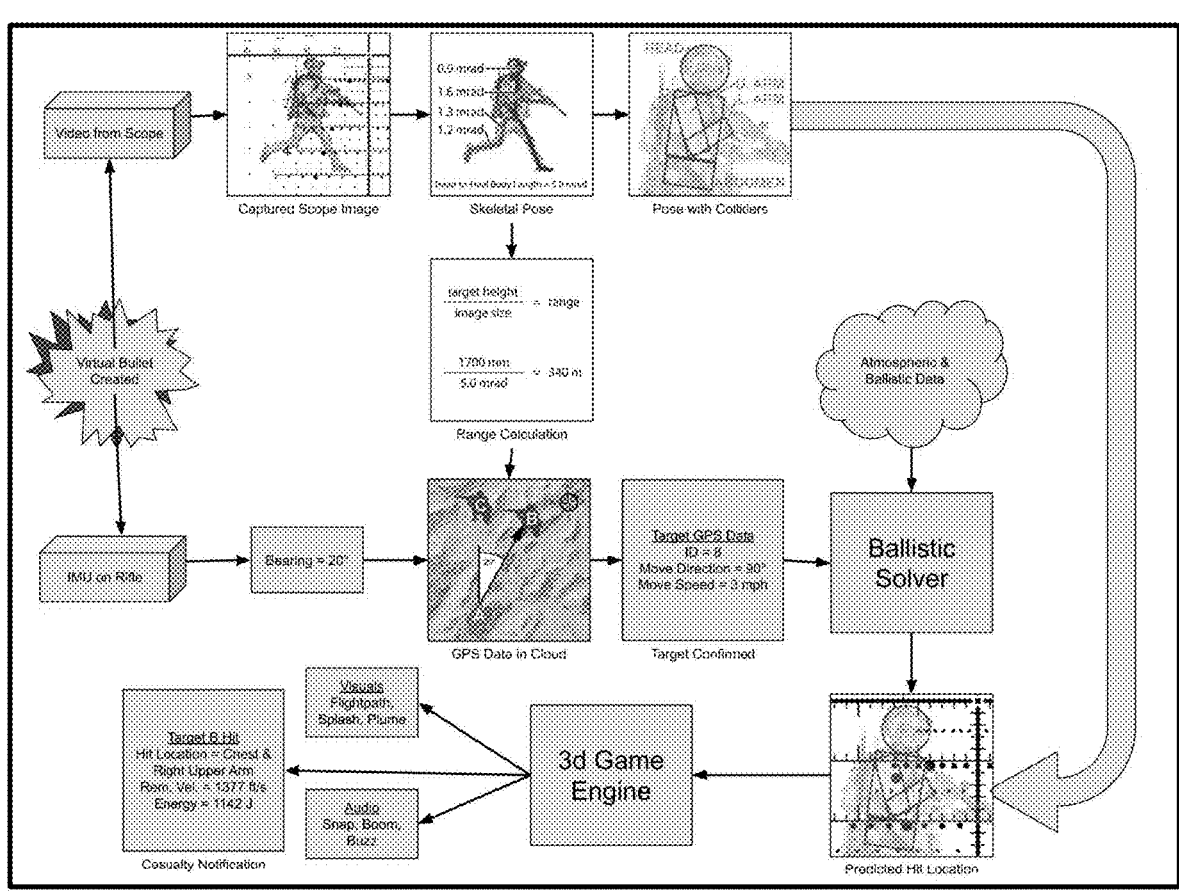
FIG. 9 shows a force on force ballistics flow chart.
Figure 10:
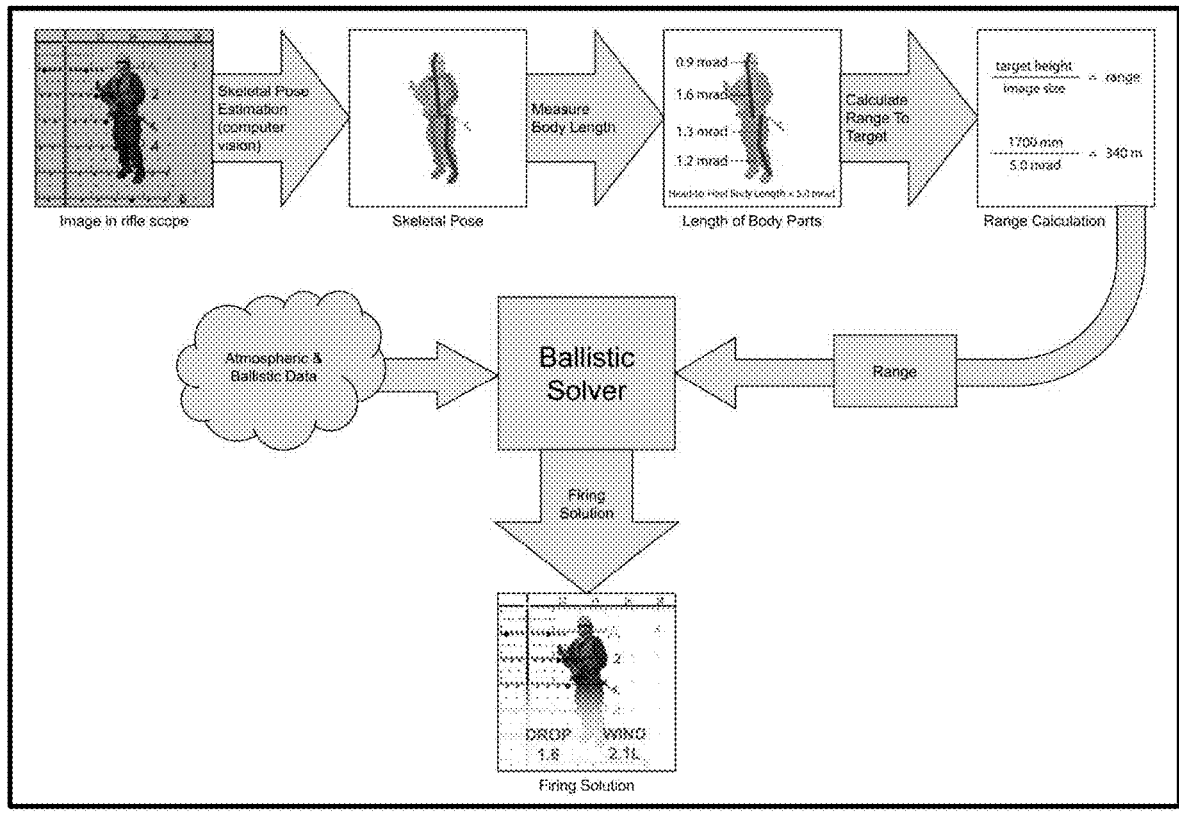
FIG. 10 shows a system operation flowchart comprising a ballistic solver.
Figure 11:
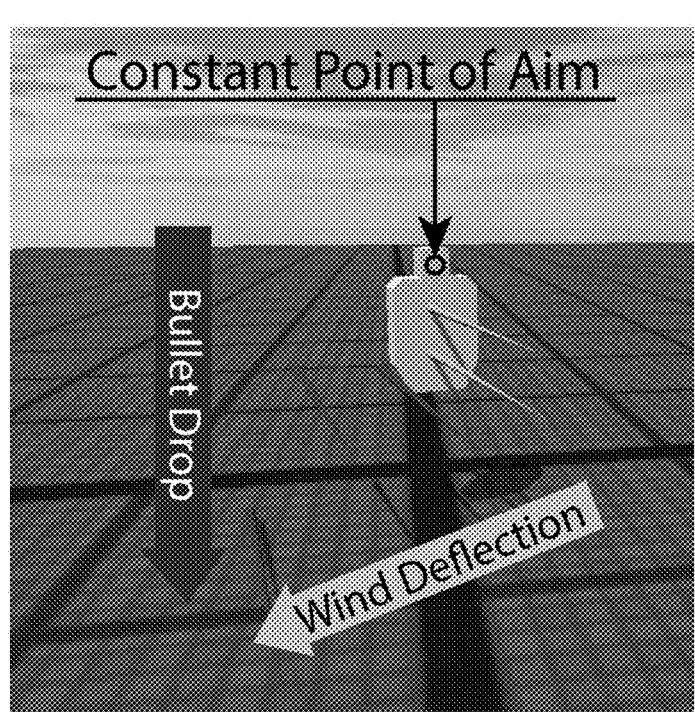

In some embodiments, systems and methods of the present claim provide force on force augmented simulation adjudication based on real-world ballistic solutions. In some embodiments, the system comprises other real-world humans in addition to a shooter and/or user located by GPS and/or image capture. In some embodiments, the system comprises synthetic human targets. In some embodiments, projectile impact adjudication in force on force training is based on one or more solutions provided by a ballistic solver comprising atmospherics, a combination of GPS position and heading and velocity of travel of a shooter and a target, aligned visual images, effective range of the weapon, and/or impact location on a target (see e.g., FIG. 9). In sonic embodiments, the effective range of a weapon is integrated into an augmented reality force on force training system using a ballistic calculator as a ballistics solver component (see e.g., FIG. 10). In sonic embodiments, the system provides a trainee with feedback of the shots they have fired and have had fired at them. In some embodiments, the system evaluates a trainee's tendencies as a shooter, and trainee responses to shots near the trainee. In some embodiments, the system archives and/or displays any or all shooting data for review by a shooter and/or trainee. In some embodiments, the system archives and/or displays performance and actions of a squadron or platoon. In some embodiments, the system archives shooting data, then analyzes shooting data, and then displays the shooting data (see e.g., FIG. 11).

In some embodiments, the systems and methods of the present invention provide one or more real time alerts to a user entering a combatant zone of danger i.e., a "red zone." in some embodiments, the system uses GPS and ballistics data to identify and report trends in shooter and/or trainee behavior, for example, failure to find cover. In some embodiments, the system uses computer vision to recognize landmarks, and to estimate target speed & direction. In some embodiments, the system provides artificial intelligence (AI) and or machine learning training to identify trainee errors, and to provide subsequent training regimens to correct trainee errors. In some embodiments, the system provides tracking sensors on system components including, for example, a firearm or other weapon, and or tracking sensors on one or more shooters to soldier, to identify sources of error throughout the system in operation.

Figure 12:
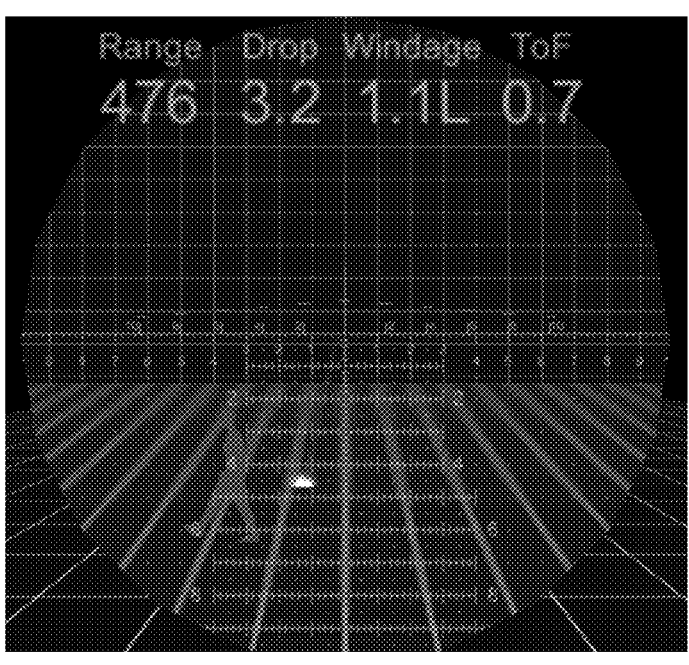
FIG. 12 shows projectile splash from a shooter's perspective.
Figure 13:
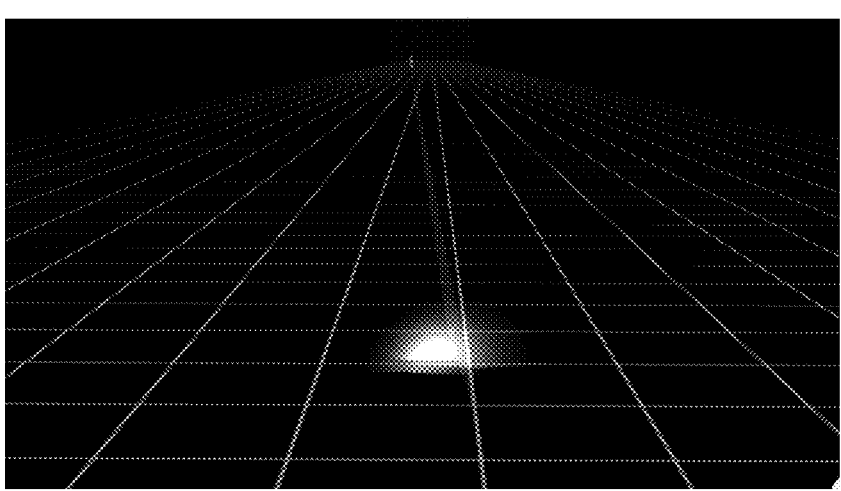
FIG. 13 shows a high magnification projectile splash from a shooter's perspective.

In some embodiments, the systems and methods of the present invention determine the penetration of a projectile on a target, and the presence or absence or obscurants. In some embodiments, the system provides synthetic muzzle flash, bullet flight sounds, and splash sounds visual images from other trainees firing at a user (see e.g., FIG. 12, FIG. 13). In sonic embodiments, damage evaluation based on a projectile, mortar or bomb is GPS-based. In some embodiments, visual simulation of damage is overlaid on real-world image based on the ballistics and explosive capabilities of one or more projectiles. In some embodiments, system provides GPS data and/or laser range finder (LRF) data, one or more images and one or more ballistic solutions to simulate and evaluate training, performance, and/or force on force simulation. In some embodiments, the system uses computer vision that enables computers and systems to derive meaningful information from digital images. In some embodiments, computer vision is used to convert real-world humans into virtual and/or augmented world combatant enemies, for range estimation, for movement speed and direction estimation, and for use with one or more dynamic reticles configured to adjust one or more reticle aiming points in accord with changes in one or more ballistic factors, for example, wind speed and direction. In some embodiments, the system comprises a headset with ballistic calculation and display, and a camera that tracks a rifle position and point of aim with no additional hardware required external the headset. In some embodiments, the headset provides the (IPS position of targets for force on force. In some embodiments, the headset comprises a camera and geometric ranging for operational utility.

In some embodiments, the systems and methods of the present invention comprises mission rehearsal elements. In some embodiments, the system uses 3-dimensional landscape data, atmospherics, and aircraft and or vehicle decibel (dB) levels to determine a preferred entry and or location in augmented reality or virtual and/or augmented reality. In some embodiments, the system simulates preferred weaponry and capacities appropriate for one or more synthetic enemies. In some embodiments, the system identifies one or more objects for use with artificial intelligence to provide wind speed and direction. In some embodiments, the system uses artificial intelligence to identify one or more preferred positions for a user to shoot a target while limiting the ability of a target to shoot at a user. In some embodiments, the system provides visual. GPS, and or 3-dimensional map data correlation. In some embodiments, the system monitors user biometrics to improve accuracy and to evaluate risk points. In some embodiments, mission rehearsal elements correlated to real-world imagery In some embodiments, systems and methods of the present invention provide GPS, image capture, and geometric ranging, with a ballistic solver and augmented reality headset. In some embodiments, a camera in a headset is used for wind speed and wind direction measurement. In some embodiments, the camera captures an image of an aiming point, and/or records the image for use in training adjudication. In some embodiments, the camera image comprises a Quick Response (QR) code and/or object tracking software to record a user's aiming actions. In some embodiments, a camera provides an image for a headset correlated with user and target GPS to indicate proper aiming actions. In some embodiments, a camera output from a day view optic as seen through a waveguide to a complementary metal—oxide—semiconductor (CMOS) sensor for capturing an image beyond the perimeter of a target acquisition device. In some embodiments, a camera identifies a projectile trace through the atmosphere, and uses a ballistic solver to narrow aiming focus and to provide wind speed and direction. In some embodiments, systems of the present invention use a ballistic solver to focus an area to identify one or more projectile impacts. In some embodiments, the system uses a camera to identify a hit or a miss of a projectile on a target, and to correct for muzzle velocity, ballistic coefficient and/or wind call based on the hit or miss.

In some embodiments, the system uses a thermal measurement to correct muzzle velocity based on the barrel temperature of a weapon. In some embodiments, the system uses sensors to identify a target's shooting position, for example, the muzzle temperature and/or gases from an enemy combatant's firearm barrel, and calculates and displays a ballistic solution to the target's shooting position. In some embodiments, the system uses computer vision to detect the location and point of aim of an enemy combatant. In some embodiments, the system comprises input from multiple locations on multiple targets and GPS locations to determine user "safe zones" and user "danger zones" from enemy combatant fire based, for example, on features of an enemy combatant's weapon. In some embodiments, the system uses sensor data to construct an environment in real time and provides one or more ballistic solutions to a user based on a user's ballistics capabilities and/or an enemy's shooting capabilities. In some embodiments, the system incorporates user biometric data to improve accuracy and to correct for missed targets. In some embodiments, the system provides one or more ballistically dynamic reticle overlays wherein the reticle view by a user is adjusted for the user's specific weapon, environmental conditions and/or real-world observed projectile impacts at diverse known ranges.

In some embodiments, the system comprises noise capture and distance that it is audible. In some embodiments, the system requires retina security for use. In some embodiments, the system provides geometric ranging that provides a ballistic solution, warnings to a target user, and safety and danger zones. In some embodiments, the safety and danger zones are visually provided. In some embodiments, the system provides GPS-based weapon safety to a user and co-users (for example, a warning to preclude "friendly fire"), blue force tracking wherein the system comprises the location and ballistics of allied shooters and users, to determine if an allied user is at risk of friendly fire.

In some embodiments, systems and methods of the present invention provide one or more enemy combatants. In some embodiments, enemy combatants are human enemy combatants. In some embodiments, human enemy combatants are enhanced with mechanical, biologic and/or software enhancements comprising, for example, artificial intelligence and/or machine learning. In some embodiments, users of the systems and methods of the present invention are enhanced humans with mechanical, biologic and/or software enhancements. In some embodiments, one or more enemy combatants is a land-based and/or aerial autonomous weapon system operating with and without human decision oversight. In some embodiments, systems and methods of the present invention provide augmented reality force on force training, mission planning, mission rehearsal, and operational use against enemy combatant autonomous weapon systems and autonomous weapon swarms. In some embodiments, systems and methods of the present invention provide augmented reality ballistics and/or aiming solutions for non-solid projectile weapons including, for example, a directed energy weapon, a laser weapon, a microwave weapon, a particle beam weapon, an acoustic weapon, a plasma weapon, and the like, In some embodiments, the system comprises indices of geometric target speed and lead, and infers direction to a target from a shooter by angular measurement in an optical device. In some embodiments, the system displays projectile flight and point of impact to a soldier or other user. In some embodiments, the system provides real time artificial intelligence feedback to a user to improve a shooter's performance and to reduce ammunition consumption. In some embodiments, the system provides geometric ranging. In some embodiments, a ballistic solver calculates a ballistics solution and displays one or more aiming points in an augmented reality headset. In some embodiments, the system aligns an aiming point from firearm and or weapon to a target. In some embodiments, a day view optic is used with an augmented reality headset to display ballistics information, to align an augmented reality headset to an optic and to display information superimposed over an image to include ballistic measurements and estimates, holdover, and one or more aiming points on a reticle. In some embodiments, the system uses enemy combatant shooting location, firearm ballistics, atmospherics and geometry to identify areas where the soldier wearing the system will be safe. In some embodiments, the system displays safe zones and danger zones to a user based on ballistics measurements, atmospherics, light detection and radar (LIDAR), and topography. In some embodiments, the system displays shooting positions with a high probability of a shooter hitting a target, and low probability of an enemy target hitting a shooter. In some embodiments, mission planning based on geo-referenced 3-dimensional imagery provides a user with preferred positions to setup for firing a projectile in view of the shooter's and target's firearm ballistic capabilities, and further taking into account atmospherics, effective ranges of weapons, shooter biometrics and the like. In some embodiments, the system provides after action review (AAR) comprising tracking of all shots from by, for example, GPS, rifle position, and ballistic solver solutions to identify where rounds have been fired. In some embodiments, video images at the time of trigger pull are archived.

Figure 14:
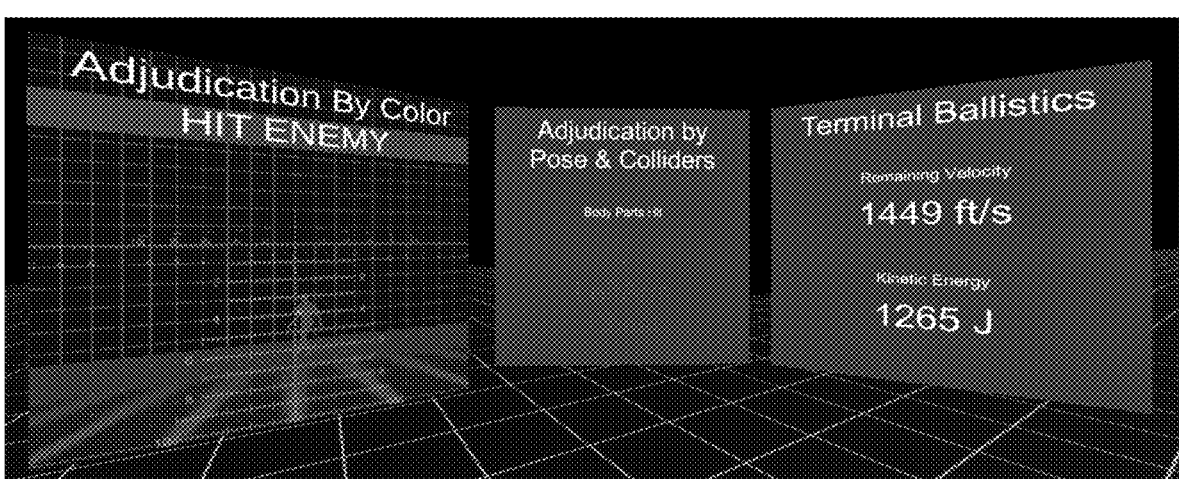
FIG. 14 shows adjudication of projectile impact using skeletal pose colliders and terminal ballistics.

In some embodiments, systems and methods of the present invention find utility in real-world, virtual and/or augmented reality, augmented reality, consensual reality and augmented consensual reality hunting applications comprising, for example, geometric ranging, and calculation of one or more ballistic solutions for one or more projectiles and targets. In some embodiments, the system provides data to evaluate features of a game animal and its surroundings comprising, for example, sex, age, health, compliance with state and Federal legal target requirements, state and Federal legal shooting environments (for example, distance from roads and habitations, public vs. private land holdings), trophy score, Pope and Young score, Boone and. Crocket score using, for example, colliders to determine the size of an animal from its antlers, bag limits, license and stamp requirements, and ethical hunting provisions. In some embodiments, the system uses imagery from the target acquisition device and skeletal pose of the target to estimate the size of target. In sonic embodiments, the system uses the size of a target to calculate a range to a target. In some embodiments, the system uses a range to a target to calculate a firing solution. In some embodiments, the system uses a tiring solution to determine if and where a projectile would impact with a target skeletal pose (see e.g., FIG. 14). In some embodiments, the impact location is overlaid on real target image.

The controller can be any type of controller. In some embodiments, the controller has the shape or form of a firearm or other shooting device. The controller can be a firearm game or game engine controller, a number of which are commercially available. In some embodiments, the controller is an actual firearm. In some embodiments, the controller comprises one or more sensors in communication with a computer that conveys the positions of the controller relative to a user and in 3-dimensional space. Where the controller is a real firearm, the sensor may be attached to one or more locations on or in the firearm. In some embodiments, the controller comprises a trigger, button, or other actuator that when pressed, pulled, or otherwise actuated by a user, indicates to the computer that a shot has been made.

The viewer is any type of viewer that projects a simulated image (e.g., landscape comprising a target) to a user. In some embodiments, the viewer is a virtual and/or augmented reality headset. In some embodiments, the viewer comprises a headset comprising one or more of a processor, a power source connected to the processor, memory connected to the processor, a communication interface connected to processor, a display unit connected to the processor, and sensors connected to processor. In certain embodiments, the viewer is a virtual and/or augmented reality unit, for example, an Oculus Rift headset available from Oculus VR, LLC. In another embodiment, the virtual and/or augmented reality unit is the HTC Vive headset available from HTC Corporation, or an Apple virtual reality and/or augmented reality headset. In this embodiment, a set of laser position sensors is attached to an external surface of a virtual and/or augmented reality unit to provide position data of the virtual and/or augmented reality unit. Any suitable virtual and/or augmented reality unit known in the art may be employed. Other exemplary embodiments include hardware comprising an Intel Core i5-4590 or AMD FX 8350 processor equivalent or better, a NVIDIA GeForce GTX 1060 or AMD Radeon Rx 480 graphics card or better, 4 GB of RAM or better, a 1X FIDMI 1.4 port or DiplayPort 1.2 or better, USB 1xUSB 2.0 port or better, and a Windows 7 SP1, Windows 8.1, Windows 10 or better operating system.

The processor and is configured to run software that communicates with the controller and the viewer. The processor may be contained in the controller or the viewer. Communication may be wired or wireless.

In use, in some embodiments, a generated target is simulated. The controller, held by a user, is tracked to generate a ballistics solution displayed on the viewer at a lead distance and an elevation from the target as viewed through the viewer. The processor determines a hit or a miss of a shot directed at a target using the position of the controller and a ballistic solution that accounts for the selected shooting conditions (e.g., user selected conditions). In some embodiments, a simulated bullet flight path is generated and displayed in the viewer overlaid onto the shooting landscape displayed on the viewer.

In some embodiments, a target is simulated as seen, for example, through a target acquisition device comprising a reticle. In some embodiments, the reticle comprises a pattern designed for long range shooting with marking that assist a shooter in accurately hitting long range and/or moving targets under a range of different shooting conditions (e.g., environmental conditions). Such reticles include, but are not limited to, Floras Vision (HVRT) reticles such as the H58/59 reticles and TREMOR reticles (see e.g., FIG. 4) (see e.g., U.S. Pat. Nos. 9,574,850 and 9,612,086, herein incorporated by reference in their entireties).

In some embodiments gloves or other clothing items with sensors are worn by a user. The sensor may monitor finger movement (e.g., to provide an actuation for the shot), biosensor information about the shooter (e.g., hand position, heart rate, etc.), or other desired information and may provide tactile (e.g., vibratory) or other feedback to the user.

In some embodiments, the systems and methods are implemented in hardware or software (including firmware, resident software, micro-code, etc.) or in combined software and hardware, for example as a "circuit," "module," "component," or "system." In certain embodiments, aspects of the invention are provided in the form of a computer program product embodied in one or more computer readable media having computer readable program code embodied thereon. Any combination of one or more computer readable media may be used. The computer readable media may be a computer readable signal medium or a computer readable storage medium. For example, a computer readable storage medium may be, but need not be limited to, an electronic, magnetic, optical, electromagnetic, or semiconductor system, apparatus, or device, or any suitable combination of the foregoing. Other examples of computer readable storage medium include, but are not limited to: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. Computer readable storage medium may comprise any tangible medium that may contain or store a program for use by or in connection with an instruction execution system, apparatus, or device. A computer readable signal medium may include a propagated data signal with computer readable program code embodied therein, for example, in baseband or as part of a carrier wave. The propagated data signal may take any of a variety of forms, including, but not limited to, electro-magnetic, optical, or any suitable combination thereof. Program code embodied on a computer readable signal medium may be transmitted using any appropriate medium, including but not limited to wireless, wireline, optical fiber cable, RF, or any suitable combination thereof.

Computer program code for carrying out operations for aspects of the systems and methods may be written in any combination of one or more programming languages, including an object oriented programming language such as Java, Scala, Smalltalk, Eiffel, JADE, Emerald, C++, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages.

Computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts described herein.

In some embodiments, systems and methods of the present invention comprise a network, a simulation administrator connected to the network, and a user device connected to the network.

In specific embodiments, the simulation administrator connected to the simulation database for data storage includes, for example, target data, firearm data, and environment data. In certain embodiments, the network is a local area network. In other embodiments, the network is a wide area network including, for example, the Internet, a wireless network, a cloud network, a satellite network, a wired network, a cellular network, a 5G or higher G network, or a combination thereof.

In some embodiments, the simulation administrator comprises a processor, a network interface connected to the processor, and memory connected to the processor. A simulation application is stored in the memory and executed by the processor. The simulation application comprises, for example, a ballistic solution application, and a statistics application that monitors, for example, user performance. In a further embodiment, a position application communicates with a position tracker connected to a controller to detect the position of the controller for the simulation application. A statistics application communicates with a database to retrieve relevant data and generate reports according to desired simulation criteria, such as selected firearms and cartridges, environments, target characteristics, and shooter characteristics for the simulation application. In particular embodiments, the simulation application generates and projects a ballistic solution projectile trajectory.

In some embodiments, a statistics application communicates with a database to retrieve relevant data and to generate images according to selected simulation criteria including, for example, the delay time between the shot and the impact, and diverse factors that influence projectile trajectory including, for example, information regarding external field conditions (for example, date, time, temperature, relative humidity, target image resolution, barometric pressure, wind speed, wind direction, hemisphere, latitude, longitude, altitude), firearm information (for example, rate and direction of barrel twist, internal barrel diameter, internal barrel caliber, and barrel length), projectile information (for example, projectile weight, projectile diameter, projectile caliber, projectile cross-sectional density, one or more projectile ballistic coefficients (as used herein, "ballistic coefficient" is as exemplified by William Davis, American Rifleman, March, 1989, incorporated herein by reference), projectile configuration, propellant type, propellant amount, propellant potential force, primer, and muzzle velocity of the cartridge), target acquisition device and reticle information (fur example, type of reticle, power of magnification, first, second or fixed plane of function, distance between the target acquisition device and the barrel, the positional relation between the target acquisition device and the barrel, the range at which the telescopic gunsight was zeroed using a specific firearm and cartridge), information regarding the shooter (for example, the shooter's visual acuity, visual idiosyncrasies, heart rate and rhythm, respiratory rate, blood oxygen saturation, muscle activity, brain wave activity, and number and positional coordinates of spotters assisting the shooter), and the relation between the shooter and target (for example, the distance between the shooter and target, the speed and direction of movement of the target relative to the shooter, or shooter relative to the target (for example, where the shooter is in a moving vehicle), the Coriolis force, the direction from true North, and the angle of the rifle barrel with respect to a line drawn perpendicularly to the force of gravity).

In some embodiments, the systems and methods comprise a program that provides shooting instructions and/or shooting calibration exercises, For example, in some embodiments, the systems and methods provide a menu and options for zeroing a simulated firearm in the virtual and/or augmented reality landscape (e.g., at a simulated 100 yard or a 100 meter range).

In some embodiments, the simulation application comprises information regarding external conditions in a database and/or entered by a user in response, for example, to a query. In one embodiment, data is entered into the system using any conventional input device linked to the system, such as a keyboard, mouse, touch-screen and the like. In some embodiments, preset conditions are selected from a database. In a further embodiment, a voice recognition system using a microphone and appropriate software for converting the spoken words to data is used to input data. In yet a further embodiment, cabled or wireless components from other measuring devices and sources is used to input data, for example Bluetooth components. In another embodiment, instruments for data input, for example, a Kestrel handheld device or similar handheld, weather station, laptop or desktop device, handheld global positioning system (GPS) or similar device, Leica Vector 4 rangefinder or similar device, and the like, are integrated with the computing device in such a way as to allow input data items to be made available to the ballistic program. In some embodiments, a direct connection is made between the external instruments and the calculator.

In some embodiments, the simulation application employs wind information. The information may be selected or input by a user or provided as part of a pre-set simulation randomly selected, selected based on a level of difficulty, etc.). In some embodiments, the wind information comprises simulated wind speed (e.g., in miles per hour, meters per second, kilometers per hour, or knots per hour). In some embodiments, the wind information comprises wind direction. In certain embodiments, the virtual and/or augmented reality simulation application projects wind arrows comprising wind velocity, acceleration, flow (e.g., laminar, turbulent or a combination of flow), and direction in 1, 2 or 3 axes.

In some embodiments, the simulation application employs information regarding the simulated rate and direction of barrel twist (that is, right or left), barrel length, internal barrel diameter, and internal barrel caliber. Spin drift is a force exerted on a spinning body traveling through the air due to uneven air pressure at the surface of the object due to its spinning. This effect causes a baseball to curve when a pitcher imparts a spin to the baseball as he hurls it toward a batter.

In some embodiments, the simulation application employs information regarding the type of projectile to be used. In some embodiments, the simulation application employs information regarding the weight of the projectile (e.g., in grains). The weight of the projectile may be stored in memory and automatically retrieved by the program when the user selects a standard, defined cartridge. In some embodiments, the simulation application employs information regarding the muzzle velocity of the projectile. Muzzle velocity (MV) is a function of the projectile's characteristics (for example, projectile weight, shape, composition, construction, design, etc.), the kind, quality and amount propellant used in the cartridge case, and the primer. Muzzle velocity is also a function of the barrel length of the firearm, such that the longer the barrel length, the greater the muzzle velocity.

In some embodiments, the system requests or measures the shooter's eyesight acuity and idiosyncrasies, heart rate and rhythm, respiratory rate, blood oxygen saturation, muscle activity (as measured by the electromyogram), and brain wave activity (as measured by the electroencephalogram), or other physiologic variable. In some embodiments, the system provides training exercises to assist a shooter in improved shooting that takes into account the shooter's biological characteristics.

In a further embodiment, the simulation system queries the user for the number and positional coordinates of simulated or actual third person spotters. In an additional embodiment, the ballistics calculator system automatically queries other units to determine the number, location and type of third person spotters and devices. In one embodiment, the shooter and spotters use identical simulated target acquisition device reticles. The simulated target acquisition devices and reticles used by shooters and spotters may be fixed or variable power. In another embodiment, the spotting information and aiming points are projected on reticles shared by the shooter and spotters. In yet another embodiment, multiple shooters and spotters share optical or electronically linked simulated target acquisition devices and reticles.

In some embodiments, the simulation application employs information regarding the range or distance from the shooter to the simulated target. For example, the shooter may enter a distance estimated by reference to a rangefinder on the reticle. In a further embodiment, the distance from the shooter to the target is provided by a peripheral device, for example a simulated laser rangefinder. In another embodiment, the distance from the shooter to the target is provided by actual or simulated spotters assisting the shooter, by the use of a topographic map, or by triangulation. In other embodiments, the virtual and/or augmented reality simulation application of the present invention comprises images and data derived from real-world landscapes obtained from, for example, Google Earth, drone images, satellite images and the like, that prepare the shooter for conditions and circumstances to be encountered at a remote site (e.g., simulated training for a future real life shooting scenario).

In some embodiments, the simulation application employs slope information if any, that is, the angle from 0 to 90 degrees up or down between the shooter and the simulated target, that is, the vertical angle when the shooter is shooting uphill or downhill. This information is used to adjust the downrange aiming point based on the projectile's flight through space from the point of firing to target. As can be appreciated, the distance to a target at a sloped angle is somewhat longer than the horizontal distance to a target the same distance from the shooter at the same level, and typically requires the shooter to raise or lower the barrel of the firearm relative to an. axis perpendicular to the force of gravity. A shooter aiming downhill lowers the barrel relative to the perpendicular axis forming an angle which is the "downhill" angle. As will be understood, when the shooter raises the barrel above the perpendicular axis (for example, when shooting at a target located above the shooter), the angle formed between the perpendicular axis and the barrel will be an "uphill" angle.

In one embodiment, for long range shooting (e.g., from 1000 to 3000 yards or more), the simulation application employs information for the Coriolis effect and spin drift. The Coriolis effect is caused by the rotation of the earth. The Coriolis effect is an inertial force described by the 19th-century French engineer-mathematician Gustave-Gaspard Coriolis in 1835, Coriolis showed that, if the ordinary Newtonian laws of motion of bodies are to be used in a rotating frame of reference, an inertial force-acting to the right of the direction of body motion for counterclockwise rotation of the reference frame or to the left for clockwise rotation must be included in the equations of motion. The effect of the Coriolis force is an apparent deflection of the path of an object that moves within a rotating coordinate system. The object does not actually deviate from its path, but it appears to do so because of the motion of the coordinate system. While the effect of the earth's movement while a bullet is in flight is negligible for short and medium range shots, for longer range shots the Coriolis effect may cause a shooter to miss.

In some embodiments, the simulation application employs target movement information, with simulated movement relative to the shooter or, in some embodiments, simulating movement of the shooter (e.g., simulating shooting from a moving vehicle). In some embodiments, training exercises are provided to train the shooter to accurately shoot targets moving relative to the shooter, including training to use reticle markings to estimate movement direction and speed and to efficiently target moving targets.

In some embodiments, systems and methods provide target-like movements in response to projectile strikes. In other embodiments, the simulated or actual firearm in use is configured to provide recoil, report, and muzzle movement to the user upon shooting. In certain embodiments, the simulated or real firearm is provided with, and used with, one or more simulated cartridges, or one or more magazine of cartridges.

In some embodiments, the projectile trajectory is projected before the trigger pull, after the trigger pull, or both before and after the trigger pull. In particular embodiments, the projected trajectory is modified to display the influence of individual variables alone and/or in combination on the projectile trajectory. In certain embodiments, the projected trajectory may be viewed from any perspective including, for example, from the shooter's perspective, the target's perspective, a spotter's perspective, a bystander's perspective, or an aerial or satellite perspective. In further embodiments, two or more projected trajectories may be overlaid upon one another and may be visually and mathematically compared.

In some embodiments, the systems and methods are configured for the design and testing of firearms, target acquisition devices, reticles, and methods, hardware and software that provide information regarding, variables that influence projectile trajectories, and their interactions in combination. In particular, systems and methods comprising virtual and/or augmented reality simulation applications are provided that replicate conditions that are difficult or impossible to purposefully vary during real-life, real-time testing with live ammunition including, for example, humidity, barometric pressure and elevation.

In some embodiments, the systems and methods comprise a virtual and/or augmented reality simulation application that simulates low light and night time shooting with, and without, illumination of various degrees of intensity e.g., with and without visible light illumination, infrared illumination, ultraviolet light illumination, thermal illumination, and the like. In other embodiments, the simulation application of the present invention is configured to test and to compare shooting performance with different spectra and different intensities of ambient and target illumination.

In some embodiments, the systems and methods provide a graduated marksmanship training curriculum. For example, the virtual aid/or augmented reality user acquires basic rifle marksmanship including the skills of steady positioning, aim, breath control and trigger pull.

In Phase 1, the virtual and/or augmented reality user acquires skills of basic scoped rifle use including estimation of bullet drop, wind deflection, lead of a moving target, spin drift, and. Coriolis force.

In Phase 2, the virtual and/or augmented reality user acquires skills for precision shooting that account for atmospheric effects (e.g., relative humidity, altitude, barometric pressure and temperature), coordination with spotters (e.g., coordination on estimation of wind speed, target speed and target size), advanced wind skills (e.g., variable wind speed and direction, wind vector calculation), intelligent targeting skills (e.g., response to threats, attacks by apparently friendly targets, attacks to the user, and team communication), electronic hardware skills (e.g., use of weather meters, wind meters, laser range finding, Solver software applications), advanced optics skills (e.g., milling, second shot correction, breaching), moving target skills (e.g., time of flight) and high angle shooting. In certain embodiments, advanced optics skills comprise virtual and/or augmented reality training in the use of reticles comprising one or more of the features described in one or more of U.S. Pat. Nos. 9,869,530, 9,612,086, 9,574,850, 9,500,444, 9,459,07, 9,335,123, 9,255,771, 9,250,038, 9,068,794, 8,991,702, 8,966,806, 8,959,824, 8,905,307, 8,893,971, 8,707,608, 8,656,630, 8,353,454, 8,230,635, 8,109,029, 7,946,048, 7,937,878, 7,856,750, 7,832,137, 7,712,225, 6,681,512, 6,516,699, 6,453,595, 6,032,374, and 5,920,995, each of which is herein incorporated by reference in its entirety.

In Phase 3, the virtual and/or augmented reality user acquires multi-skill training comprising sniping without electronic aids, rapid engagement, hunting in virtual and/or augmented world settings, compensating for high wind and changing weather, and truing.

In Phase 4, the virtual and/or augmented reality user acquires skills for shooting in fully-integrated scenarios comprising, for example, real-world localities (e.g., rural, suburban and rural locations), real-world weather (including, for example, actual weather and weather forecast that are updated at relevant time intervals by satellite, Doppler, and visual weather images), one or more enemy combatants, and hierarchical mission planning. In some embodiments, weather information is provided by user worn devices. In some embodiments, weather information is provided by network access by, for example, an Azure network of Azure virtual network In some embodiments, weather information is provided by one or more drones including, for example wind velocity and wind direction information. In some embodiments, weather information is highly accurate micro-weather information (e.g., within 10 miles and 10 minutes). In some embodiments, weather information is macro-weather information e.g., the entire globe weather information with hourly updates.

In particular embodiments, skills are acquired in virtual and/or augmented reality using specific training modules integrated into specific trainer architectures with tasks relegated to a user interface (e.g., display on a desktop computer) and the virtual and/or augmented world. The virtual and/or augmented reality trainee or trainer first generates a training module comprising the number of targets, ranges, wind speed and direction and coordinates of specific targets. Then wearing the virtual and/or augmented reality goggles and holding the virtual and/or augmented reality firearm, the user applies the range and windage cards projected in the user's field of view on the goggles (e.g., to the lower left of the target) to strike the target projected ahead of the user on the goggles. The specifics of feedback including hits vs. misses, and time until each hit are provided to the virtual and/or augmented reality user in the user's field of view or on another display (e.g., computing device display). The trainee or trainer may further specify the relationships of the firearm, projectile, user and targets to comprise entry of data for calculation of a ballistics trajectory. The trainee or trainer may use a cursor to specify a chosen relationship between a shooter and target on a virtual and/or augmented reality topographic or landscape field of view. In some embodiments, the landscape is an urban, suburban, rural or wilderness landscape.

In some embodiments, the simulation applications, systems and methods of the present invention provide simulation and/or feedback showing the consequences of altering a single factor (e.g., wind) or combinations of factors (e.g., wind and humidity, etc.) that influence ability to hit a target to enhance learning and skill acquisition of marksmanship trainees.

In some embodiments, the simulation applications, systems and methods of the present invention provide satellite (e.g., global positioning satellite system) map integration to generate, for example, a virtual and/or augmented reality landscape comprising import of topographic data from one or more extrinsic sources e.g., Google Maps.

In some embodiments, the simulation applications, systems and methods of the present invention support integration of radar, Doppler radar, satellite and other weather forecast data into configuration of a virtual and/or augmented reality of use, for example, in mission planning and rehearsal, In some embodiments, the simulation applications, systems and methods of the present invention model execution of real-world missions in advance of, during and after real-world missions.

In some embodiments of the simulation applications, systems and methods of the present invention, the virtual and/or augmented reality user selects a target from a menu of real-world targets (e.g., one or more combatants, wild game targets, automobiles, tanks, and the like), or symbolic targets (e.g., circles, bullseyes, grids and the like) and their dimensions, and selects their starting points, direction and speed of travel to acquire expertise in striking moving targets.

In sonic embodiments, the simulation applications, systems and methods of the present invention provide the trainee or trainer with options for selecting target sizes and ranges for the trainee to acquire expertise in use of ranging features on a reticle to estimate range, correct compensation for range, and to receive immediate feedback of engaging one or more virtual and/or augmented reality targets. In certain embodiments, the training comprises milling and mil range estimation training.

In some embodiments, the simulation applications, systems and methods of the present invention provide metrics for qualification and advancement of a virtual and/or augmented reality user that are specific to a user's capacities, skill set and status, and immediate in time.

In some embodiments, the simulation applications, systems and methods of the present invention provide the virtual and/or augmented reality user with the opportunity to acquire skills in second shot correction if a first fails to strike a target, with timing and feedback to assure real-world ability in second shot correction opportunities.

In some embodiments, the simulation applications, systems and methods of the present invention provide custom training to each virtual and/or augmented reality trainee wherein skills that are mastered are rapidly integrated, and skills that are problematic attract increased repetition and training. In particular embodiments, tasks required for acquisition of larger skill sets may be divided into smaller skill sets comprising fewer units of information customized for each trainee.

In some embodiments, the simulation applications, systems and methods of the present invention provide virtual and/or augmented reality imaging clues to wind speed including for example, perturbations of flags, vegetation, smoke and flames, water surfaces, travel of distant objects with and against the wind, mirage and the like.

In some embodiments, the simulation applications, systems and methods of the present invention provide diverse images of otherwise identical targets with varying width, height and breadth to aid in range estimations skill acquisition.

In some embodiments, the simulation applications, systems and methods of the present invention provide images of diverse orientations and dimensions of wounds to assist the virtual and/or augmented reality user in acquisition of skills needed to determine when additional aiming points are to be sought on the same target.

In some embodiments, the simulation applications, systems and methods of the present invention provide a virtual and/or augmented reality controller mounted on a firearm that comprises options for adjustment of windage/lead, elevation, parallax and/or diopter. In certain embodiments, the mounted controller further comprises a trigger adapter. In further embodiments, the virtual and/or augmented reality firearm is otherwise identical to a real-world firearm that has been adapted for use in a virtual and/or augmented reality context.

In some embodiments, the simulation applications, systems and methods of the present invention provide virtual and/or augmented reality optical system (e.g., telescopic gunsight) simulation that enables the virtual and/or augmented reality user to adjust, for example, magnification, focus, focal distance, diopter, focal plane, zoom, and desired reticle to duplicate a physical optical system in virtual and/or augmented reality that parallel a real-world context. In certain embodiments, the virtual and/or augmented reality firearm comprises a physical, real-world scope linked to a virtual and/or augmented reality processor that adjusts the virtual and/or augmented reality optics to parallel real-world adjustments. In other embodiments, the real-world optical system and the virtual and/or augmented reality optical system are overlaid as the virtual and/or augmented reality users adjusts the windage and elevation of the physical (e.g., in-hand) virtual and/or augmented reality firearm to strike the virtual and/or augmented reality target.

In some embodiments, the simulation applications, systems and methods of the present invention provide a trainer and a trainee with a virtual and/or augmented shooting range comprising a landscape in which a trainee is assigned the task of deriving an aiming solution(s) that is scored by virtual and/or augmented firing of a projectile at a virtual and/or augmented target. In certain embodiments, the trainer and trainee share a real-world locale. In other embodiments the trainer and trainee share a virtual and/or augmented reality locale. In further embodiments, the trainee and trainee share both a real-world and virtual and/or augmented world locale. In particular embodiments, the trainee and trainer are in visual and auditory contact in either or both the real-world and virtual and/or augmented reality. In further embodiments, simulation applications, systems and methods of the present invention support competition for precision shooting between individuals, teams, and teams of shooters and spotters. In some embodiments, an image of one or more impact locations on a target from an image capture device is used by a ballistic solver of the present invention to extrapolate and display one or more projectile pathways. In some embodiments, the impact location damage assessment is on a human and/or enemy combatant. In some embodiments, the impact location and damage assessment are on one or more land vehicles, aircraft, tanks and the like.

In some embodiments, the simulation applications, systems and methods of the present invention comprise virtual and/or augmented reality targets programmed with artificial intelligence to respond appropriately to virtual and/or augmented projectiles including, for example, seeking shelter, creating diversions, or returning fire.

Figure 15:
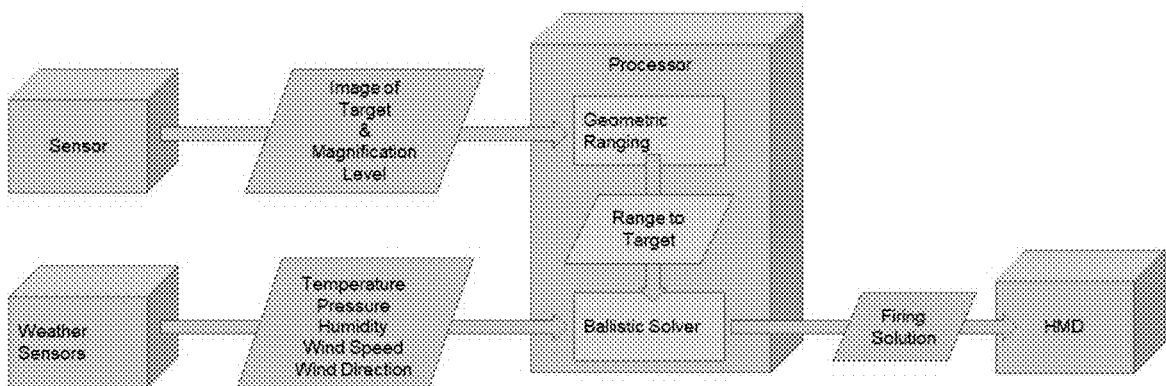
FIG. 15 shows an example of augmented reality in operational use.

In some embodiments, the simulation applications, systems and methods of the present invention provide augmented reality for operational use (see e.g., FIG. 15). In some embodiments, one or more weapon mounted sensors are uses with an augmented reality headset to identify one or targets, to estimate range using geometric ranging (e.g., automated milling) and, in some embodiments, computer vision to provide a user with a firing solution and/or point of aim displayed inside an augmented reality headset.

Figure 16:
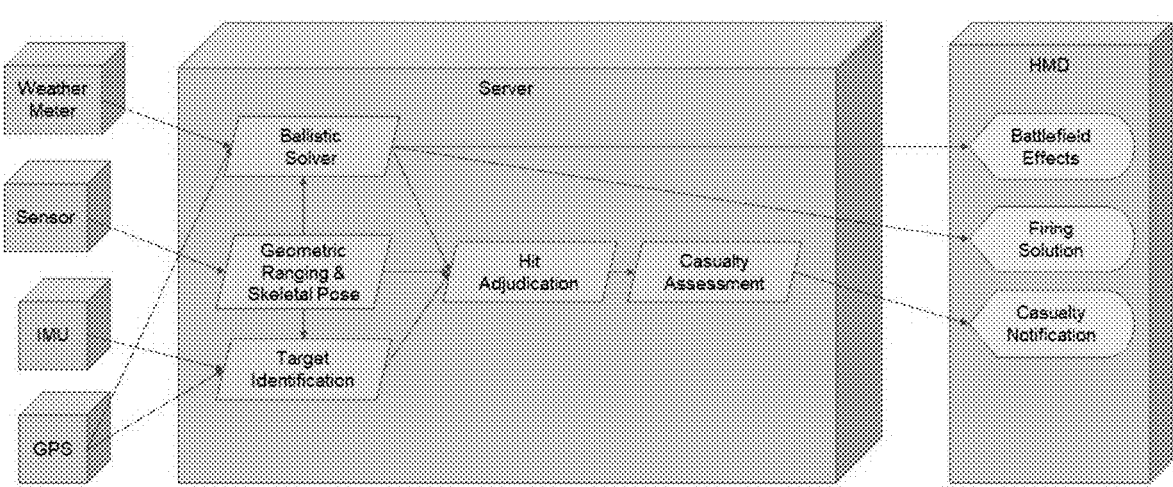
FIG. 16 shows an example of augmented reality in force on force training

In some embodiments, the simulation applications, systems and methods of the present invention provide augmented reality for force on force training (see e.g., FIG. 16). In sonic embodiments, force on force trainees are equipped with, for example, an augmented reality headset, one or more weapon mounted sensors, ballistic software, and geometric ranging comprising, in some embodiments, computer vision to generate a force on force training system, In some embodiments, the system is not impacted by obscurants, and provides enhanced realism, point of impact accuracy, adjudicated hits and misses, and realistic damage assessment. In some embodiments, the system further comprises IMU, GPS and compass components.

Figure 17:
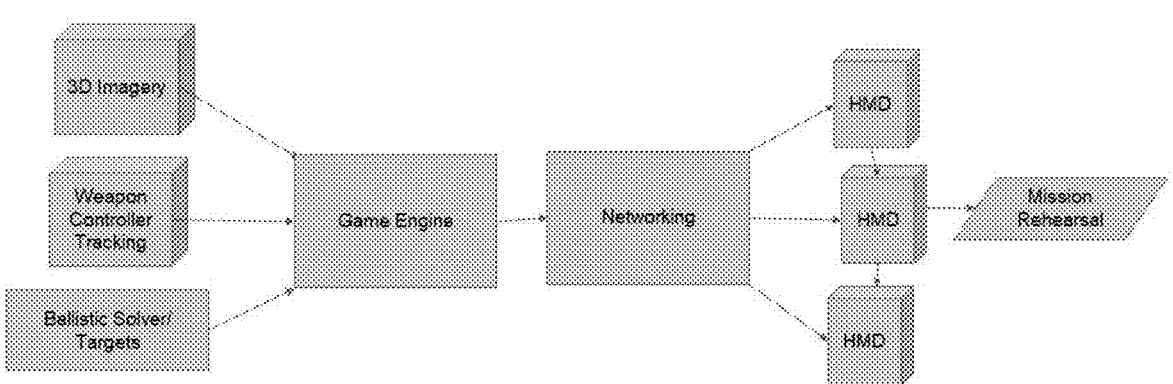
FIG. 17 shows an example of augmented reality in mission planning and rehearsal.

In some embodiments, the simulation applications, systems and methods of the present invention provide augmented reality for mission planning (e.g., FIG. 17). In some embodiments, the systems comprise 3-dimensional maps of intended areas of operation (AC)), an augmented reality headset to enter an intended area of operation, and entry of targets into the 3-dimensional map to simulate one or more engagements. In some embodiments, two or more users simultaneously conduct mission rehearsal in a 3-dimensional map environment to input and engage one or more targets.

Figure 18:
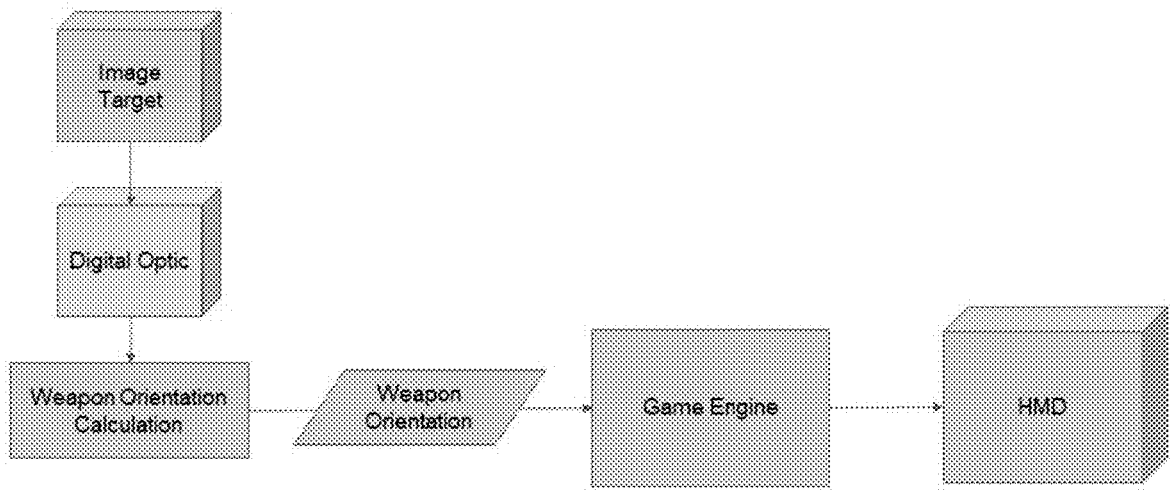
FIG. 18 shows an example of augmented reality in individual training use.

In some embodiments, the simulation applications, systems and methods of the present invention provide augmented reality for individual training use (see e.g., FIG. 18). In some embodiments, an augmented reality headset is used for individual weapons training including, for example, reticle familiarization, engagement of moving targets, and accounting for environmental effects on ballistic trajectories of one or more projectiles. In some embodiments, shoot/no-shoot training is provided.

In some embodiments, the simulation applications, systems and methods of the present invention provide military grid reference system (MGRS) coordinates of a target using, for example, geometric ranging, a user's GPS location and bearing to target. In some embodiments, the MGRS coordinates are of use in force on force training and/or in operational use to share coordinates of a target between a network of users. In some embodiments, geometric software is provided by one or more hardware components including, for example: optic only hardware; optic and body worn processor hardware; optic and cloud processor hardware; optic, HMD and body worn processor hardware; optic, HMD and cloud processor hardware; and optic and HMD hardware. In some embodiments, geometric ranging software is provided in one or more drones with and without weapons that aid in reconnaissance and/or direct action missions. In some embodiments, a drone geometrically ranges threats and gathers coordinates for a target, and transmits information a network. In some embodiments, standardized enemy combatant weapon dimensions are used by geometric ranging to range targets and threats. In some embodiments, standardized vehicle and aircraft dimensions are used by geometric ranging to range targets and threats in combination with, for example, lower resolution image capture devices. In some embodiments, geometric ranging is combined with elapsed time to provide target velocity and direction of travel relative to a user. In some embodiments, weapons systems at security positions (e.g., at the corner of a base or compound) provide a range card that automatically adjusts one or more weapon ballistic calculations. In some embodiments, geometric ranging is combined with artificial intelligence and machine learning to support automated sentries that scan, detect, identify and eliminate threats. In some embodiments, an integrated visual augmentation system (IVAS) is used to zero weapons and target acquisition devices. In some embodiments, the IVAS image capture device provides a high magnification image of the point of aim and impact locations to direct a user to properly adjust a target acquisition device.

All publications and patents mentioned in the above specification are herein incorporated by reference. Various modifications and variations of the described compositions and methods of the invention will be apparent to those skilled in the art without departing from the scope and spirit of the invention. One skilled in the art will recognize at once that it would be possible to construct the present invention from a variety of materials and in a variety of different ways. Although the invention has been described in connection with specific further embodiments, it should be understood that the invention should not be unduly limited to such specific embodiments. While the further embodiments have been described in detail, and shown in the accompanying drawings, it will be evident that various further modifications are possible without departing from the scope of the invention as set forth in the appended claims. Indeed, various modifications of the described modes for carrying out the invention which are obvious to those skilled in marksmanship, computers or related fields are intended to be within the scope of the following claims.

We claim:
1. A system, comprising:
a) at least one digital image capture device;
b) a processor; and c) non-transitory computer readable media comprising instructions for shooting a target with a projectile that when executed by said processor cause said processor to execute a shooting application, wherein said shooting application provides at least one ballistic solution, wherein said ballistic solution comprises geometric ranging a range from a user to said target comprising at least one image from said at least one digital image capture device, wherein said geometric ranging a range comprises division of an actual target dimension by a perceived target dimension in pixels provided by said at least one digital image capture device to yield said range from said user to said target.

2. The system of claim 1, wherein said actual target dimension is in millimeters (mm), said perceived target dimension provided by said at least one digital image capture device is in milliradians (mrad), and said range is in meters (m).

3. The system of claim 1, wherein said at least one digital image capture device is a camera, a visible light image capture device, an infrared image capture device, a thermal image capture device, a day vision image capture device, and/or a night vision image capture device.

4. The system of claim 1, wherein said at least one digital image capture device comprises one or more image sensors.

5. The system of claim 1, wherein said at least one digital image capture device comprises analog-to-digital converting circuitry coupled to said one or more image sensors configured to generate at least one digital image.

6. The system of claim 1, wherein said at least one digital image capture device comprises analog-to-digital converting circuitry coupled to image memory.

7. The system of claim 1, wherein said processor is a digital image processor configured to generate at least one digital image.

8. The system of claim 1, wherein said processor is intrinsic to said image capture device.

9. The system of claim 1, wherein said processor is extrinsic to said image capture device.

10. The system of claim 1, wherein said at least one digital image capture device comprises one or more lenses.

11. The system of claim 1, wherein said image capture device comprises an image of at least one pose of said target marking a shot at said target on said least one image from said at least one image capture device wherein a dimension of said pose provides a range from said user to said target.

12. The system of claim 1, wherein said image capture device comprises an image of an impact of said target with a real and/or a simulated said projectile.

13. The system of claim 1, wherein said non-transitory computer readable media comprising instructions for shooting a target with a projectile comprises hardware in a circuit, module and/or component.

14. The system of claim 1, wherein said non-transitory computer readable media comprising instructions for shooting a target with a projectile is provided by one or more hardware components comprising optic only hardware, optic and body worn processor hardware, optic and cloud processor hardware, optic, head mounted display (HMD) and body worn processor hardware, optic, HMD and cloud processor hardware, and/or optic and HMD hardware.

15. The system of claim 1, wherein said non-transitory computer readable media comprising instructions for shooting a target with a projectile comprises machine learning and/or artificial intelligence to provide wind direction, wind deflection, said target direction and velocity of travel, and/or safe user positioning.

16. The system of claim 1, comprising an interface and/or a viewer.

17. The system of claim 16, wherein said interface comprises a user interface, a visual interface, an auditory interface, a communication interface, and/or a network interface.

18. The system of claim 16, wherein said viewer is a headset.

19. The system of claim 18 wherein said target is displayed on said headset.

20. The system of claim 18, wherein said headset comprises one or more of said processor, a power source connected to said processor, memory connected to said processor, a communication interface connected to said processor, a display unit connected to said processor, and/or one or more sensors connected to said processor.

21. The system of claim 20, wherein said one or more sensors is a weather meter, a wind meter, and/or a laser rangefinder.

22. The system of claim 18, wherein said headset is a virtual reality headset, an augmented reality headset, a mixed reality headset, and/or a consensual reality headset.

23. The system of claim 18, wherein said headset provides an aiming point solution that is visible in a field of view comprising one or more of target movement, wind velocity, wind direction, wind deflection, target range, projectile drop, and time of flight.

24. The system of claim 16, wherein said viewer displays said range and/or said ballistic solution.

25. The system of claim 1, comprising a riflescope comprising said digital image capture device.

26. The system of claim 25, wherein said riflescope comprises said digital image capture device and said processor.

27. The system of claim 25, wherein said riflescope comprises a reticle.

28. The system of claim 27, wherein said riflescope is a first focal plane riflescope.

29. The system of claim 28, wherein said digital image capture device calibrates magnification of said riflescope.

30. The system of claim 1, comprising a spotting scope comprising said digital image capture device.

31. The system of claim 30, wherein said spotting scope comprises said digital image capture device and said processor.

32. The system of claim 1, comprising at least one riflescope and at least one spotting scope.

33. The system of claim 1, wherein said non-transitory computer readable media comprise computer vision instructions that when executed by said processor identify said target and/or one or more anatomical features of said target.

34. The system of claim 1, wherein said system is in physical contact with said user.

35. The system of claim 34, wherein said system is not in physical contact with said user.

36. The system of claim 1, wherein said system is in physical contact with one or more spotters, one or more other users, a surface drone, an aerial drone, a land vehicle, an aircraft, a watercraft, a spacecraft and/or a satellite.

37. A system, comprising:
 a) at least one digital image capture device;
 b) a processor; and
 c) non-transitory computer readable media comprising instructions for shooting a target with a projectile that when executed by said processor cause said processor to execute a shooting application, wherein said processor executes an interactive advanced distributed learning (ADLI) environment, wherein said shooting application provides at least one ballistic solution, wherein said ballistic solution comprises geometric ranging a range from a user to said target comprising at least one image from said at least one digital image capture device.

38. The system of claim 37, wherein said ADLI environment is a virtual ADLI environment.

* * * * *